United States Patent
Jiang et al.

(10) Patent No.: US 7,375,724 B2
(45) Date of Patent: May 20, 2008

(54) LIQUID CRYSTAL DISPLAY AND ESD PROTECTION CIRCUIT THEREOF

(75) Inventors: Bo-Ren Jiang, Taichung (TW); Chu-Yu Liu, Dongshih Township, Taichung County (TW); Chung-Jen Chen Chiang, Ji-an Township, Hualien County (TW); Kuei-Sheng Tseng, Bade (TW); Lee-Hsun Chang, Dounan Township, Yunlin County (TW)

(73) Assignee: Au Optronics Corp., Hsinchu (TW)

( * ) Notice: Subject to any disclaimer, the term of this patent is extended or adjusted under 35 U.S.C. 154(b) by 672 days.

(21) Appl. No.: 10/865,008

(22) Filed: Jun. 10, 2004

(65) Prior Publication Data

US 2005/0190168 A1 Sep. 1, 2005

(30) Foreign Application Priority Data

Feb. 27, 2004 (TW) .............................. 93105078 A

(51) Int. Cl.
*G06F 3/038* (2006.01)

(52) U.S. Cl. .......................... 345/204; 345/87; 345/98; 361/88

(58) Field of Classification Search .......... 345/87–100, 345/204, 39, 45, 55, 76, 82; 349/40; 361/88, 361/91.1
See application file for complete search history.

(56) References Cited

U.S. PATENT DOCUMENTS

| 6,175,394 | B1 * | 1/2001 | Wu et al. ...................... 349/40 |
| 6,323,847 | B1 * | 11/2001 | Kaneko et al. ............. 345/204 |
| 6,493,047 | B2 * | 12/2002 | Ha ............................... 349/40 |
| 7,006,068 | B2 * | 2/2006 | Haga ............................ 345/98 |
| 7,151,516 | B2 * | 12/2006 | Takeda et al. ................. 345/87 |
| 2001/0017611 | A1 * | 8/2001 | Moriyama ................... 345/100 |
| 2002/0154080 | A1 * | 10/2002 | Miyazaki ...................... 345/87 |

* cited by examiner

*Primary Examiner*—Richard Hjerpe
*Assistant Examiner*—Kimnhung Nguyen
(74) *Attorney, Agent, or Firm*—Thomas, Kayden, Horstemeyer & Risley

(57) ABSTRACT

A protection circuit of an LCD panel. The LCD panel includes a display cell coupled between a data electrode, a gate electrode and a common electrode. A switch includes a first terminal and a second terminal. The first terminal is coupled to the data electrode, the gate electrode or both. The switch is turned on when a voltage level of the first terminal or the second terminal exceeds a threshold voltage. An ESD protection circuit includes a capacitive load and a resistive load, coupled between the second terminal and the common electrode.

8 Claims, 4 Drawing Sheets

LIQUID CRYSTAL DISPLAY AND ESD PROTECTION CIRCUIT THEREOF

BACKGROUND OF THE INVENTION

1. Technical Field

The present disclosure relates in general to a liquid crystal display (LCD) and a protection circuit thereof. In particular, the present disclosure relates to an LCD comprising an electrostatic discharge (ESD) protection circuit.

2. Description of the Related Art

Conventional LCDs comprise a plurality of pixels arranged in arrays. Transmittance of the liquid crystal of each pixel is adjusted by applied voltage thereon. Thus, a desired gray level is presented on the screen.

FIG. 1 is a schematic diagram of a conventional liquid crystal display panel and the peripheral driving circuits thereof. As shown in the figure, an LCD panel 1 is formed by interlacing data electrodes (represented by D1, D2, D3, ..., Dm) and gate electrodes (represented by G1, G2, G3, ..., Gm), each of the interlaced data electrodes and gate electrodes control a display cell. As an example, interlacing data electrode D1 and gate electrode G1 control the display cell 100. The equivalent circuit of each display cell comprises thin film transistors (TFTs) (Q11-Q1$m$, Q21-Q2$m$, ..., Qn1-Qnm) and storage capacitors (C11-C1$m$, C21-C2$m$, ..., Cn1-Cnm). The gates and drains of the TFTs are respectively connected to gate electrodes (G1-Gn) and data electrodes (D1-Dm). Such a connection can turn on/off all TFTs on the same line (i.e. positioned on the same scan line) using a scan signal of gate electrodes (G1-Gn), thereby controlling the video signals of the data electrodes to be written into the corresponding display cell. In addition, the storage capacitor is connected between the corresponding thin film transistor and a common electrode 14 with voltage VCOM.

In addition, FIG. 1 additionally shows a portion of the driving circuit of the LCD panel 1. The gate driver 10 outputs one or more scan signals (also referred to as scan pulses) from each of the gate electrodes G1, G2, ..., Gn according to a predetermined sequence. When a scan signal is carried on one gate electrode, the TFTs within all display cells on the same row or scan line are turned on while the TFTs within all display cells on other rows or scan lines are turned off. When a scan line is selected, data driver 12 outputs a video signal (gray value) to the m display cells of the respective rows through data electrodes D1, D2, ..., Dm according to the image data to be displayed. After gate driver 10 scans n rows continuously, the display of a single frame is completed. Thus, repeated scans of each scan line can achieve the purpose of continuously displaying an image. As shown in FIG. 1, signal CTR indicates the scan control signal received by the gate driver 10, signal LD indicates a data latch signal of the data driver 12, and signal DATA indicates the image signal received by the data driver 12.

Typically, a video signal, which is transferred by the data electrodes D1, D2, ..., Dm, is divided into a positive video signal and a negative video signal based on the relationship with the common electrode voltage VCOM. The positive video signal indicates a signal having a voltage level higher than the voltage VCOM, and based on the gray value represented, the actual produced potential of the signal ranges between voltages Vp1 and Vp2. In general, a gray value is lower if it is closer to the common electrode voltage VCOM. Conversely, the negative video signal indicates that the signal has a voltage level lower than the voltage VCOM, and based on the gray value represented, the actual produced potential of the signal ranges between voltages Vn1 and Vn2. Additionally, the gray value is lower if it is closer to the common electrode voltage VCOM. When a gray value is represented, whether in a positive or negative video signal, the display effect is substantially the same.

In order to prevent the liquid crystal molecule from continuously receiving a single-polar bias voltage, thus reducing the life span of the liquid crystal molecules, a display cell alternately receives positive and negative polar video signals corresponding to odd and even frames.

During manufacture of LCD panels, ESD frequently occurs on the isolated glass substrate and damages the LCD circuit. Thus, an ESD protection circuit is designed to buffer the ESD stress.

U.S. Pat. No. 6,175,394 discloses an LCD comprising an ESD protection circuit. The ESD protection circuit is connected between a guard ring and a gate electrode or a data electrode, which is a thin film transistor with a floating gate.

U.S. Pat. No. 6,493,047 discloses an LCD comprising an ESD protection circuit. The ESD protection circuit comprises a switch having a control terminal. The ESD protection circuit is connected between a common electrode and a gate electrode or a data electrode.

Conventional methods add a short ring 15 between common electrode 14 and a gate electrode or a data electrode to release ESD current to common electrode 14 through short ring 15.

FIG. 2 shows a circuit of a conventional short ring 15. Short ring 15 comprises diodes 16 and 18. The anode of diode 16 is connected to the cathode of diode 18, and the cathode of diode 16 is connected to the anode of diode 18. Conversely, the anode of diode 18 is connected to the cathode of diode 16, and the cathode of diode 18 is connected to the anode of diode 16. The connection point of the anode of diode 16 and the cathode of diode 18 is connected to a gate electrode (G1~Gn) or a data electrode (D1~Dm) connected to the display cell 100, and the connection point of the anode of diode 18 and the cathode of diode 16 is connected to the common electrode 14. When the voltage level of the gate electrode (G1~Gn) or the data electrode (D1~Dm) is raised by ESD stress exceeding the threshold voltage of the diode 16, diode 16 is turned on, such that ESD stress is released to common electrode 14 through the turned-on diode 16. The size of common electrode 14 is large enough to sustain the ESD stress, such that damage to the display cell 100 by ESD stress is prevented.

During manufacture of LCD panels, however, ESD may occur on the common electrode 14 and damage the display cell 100 through the turned-on diode 18. Thus, the conventional short ring cannot prevent the occurrence of ESD on the common electrode 14 and resulting damage to the display cell 100. Additionally, the common electrode 14 is not grounded, and ESD protection provided thereby is limited. Thus, ESD stress may flow to other signal lines from the ungrounded common electrode.

SUMMARY

One object, among others, of the present invention is thus to provide a LCD protection circuit comprising a buffer circuit connected between the short ring and the common electrode to reduce the influence of ESD stress on the display cell.

To achieve the above-mentioned object, the present invention provides a protection circuit for an LCD panel. The LCD panel includes a display cell coupled between a data electrode, a gate electrode and a common electrode. A switch includes a first terminal and a second terminal. The first terminal is coupled to at least the data electrode, the gate electrode or both. The switch is turned on when a voltage level of the first terminal or the second terminal exceeds a threshold voltage. An ESD protection circuit is coupled between the second terminal and the common electrode, and includes a capacitive load and a resistive load.

In addition, some embodiments of the present invention provide a liquid crystal display. An LCD panel includes a plurality of display cells respectively coupled between a data electrode, a gate electrode and a common electrode. A gate driver outputs scan signals to the gate electrode. A data driver outputs video signals to the data electrode. Each switch includes a first terminal and a second terminal. The first terminal is coupled to the corresponding data electrode. The switch is turned on when a voltage level of the first terminal or the second terminal exceeds a threshold voltage. An ESD protection circuit is coupled between the second terminal and the common electrode, and includes a capacitive load and a resistive load.

BRIEF DESCRIPTION OF THE DRAWINGS

Various aspects of the present invention will become more fully understood from the detailed description, given hereinbelow, and the accompanying drawings. The drawings and description are provided for purposes of illustration only and, thus, are not intended to be limiting of the present invention.

DETAILED DESCRIPTION

Figure 1:
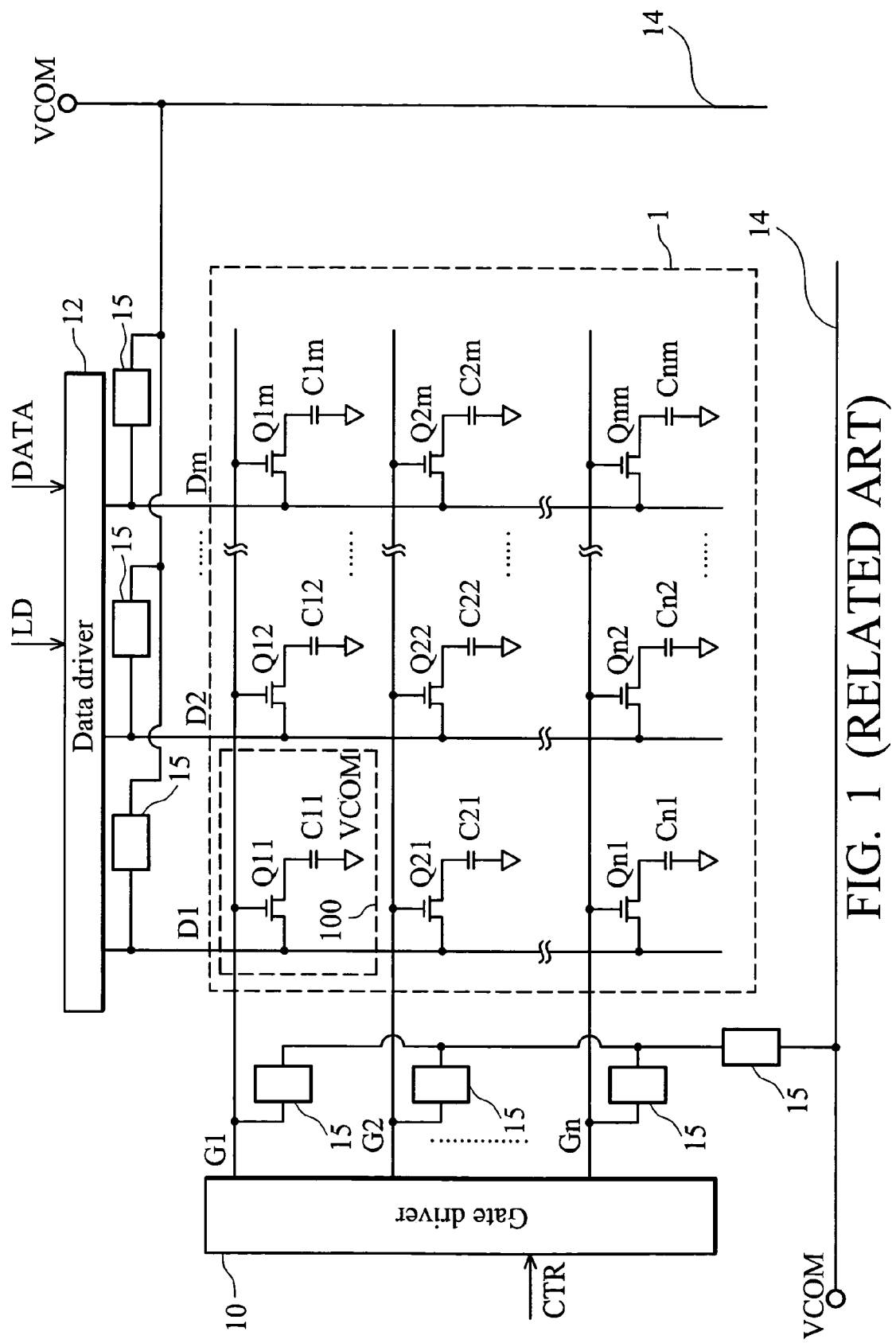
FIG. 1 is a schematic diagram of a conventional LCD panel and the peripheral driving circuits thereof.
Figure 2:
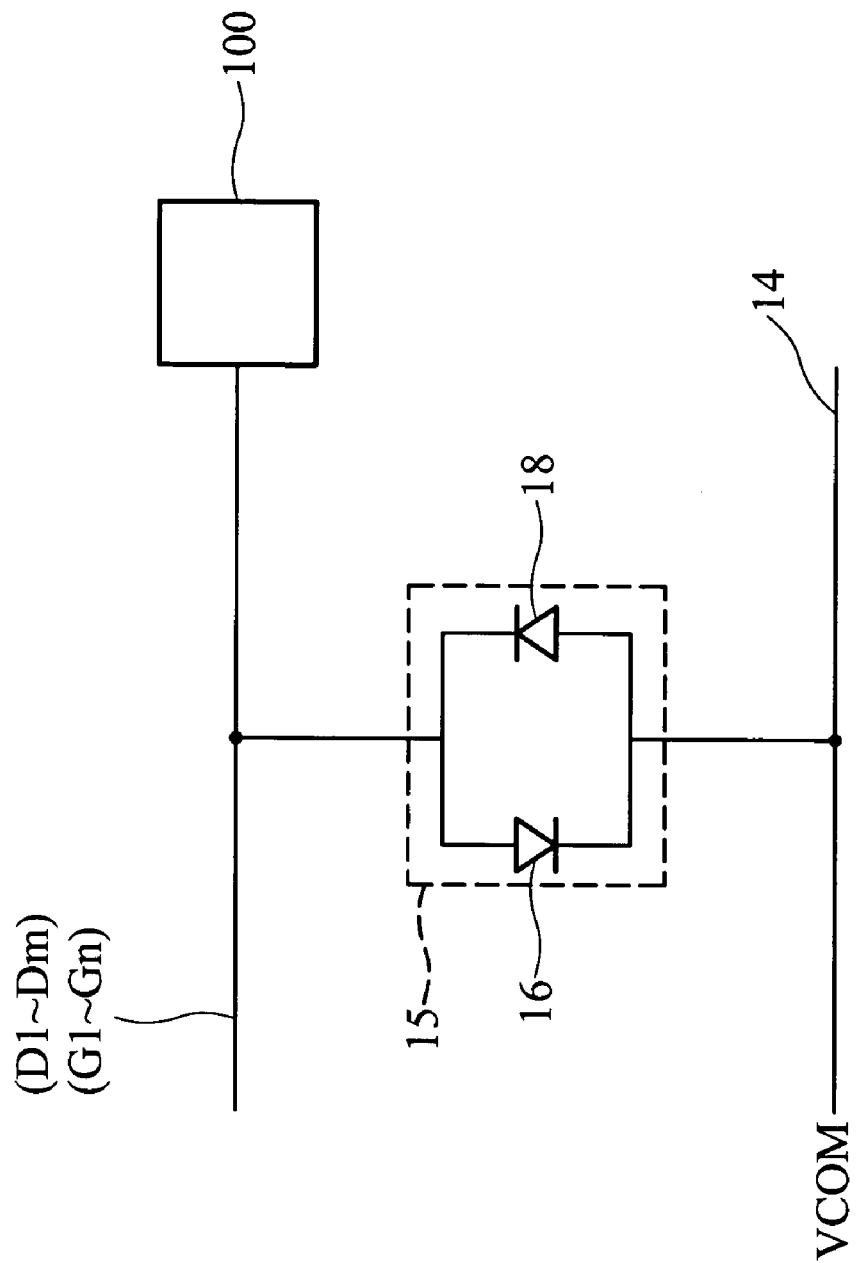
FIG. 2 shows a circuit of a conventional short ring 15. Short ring 15 comprises diodes 16 and 18.
Figure 3:
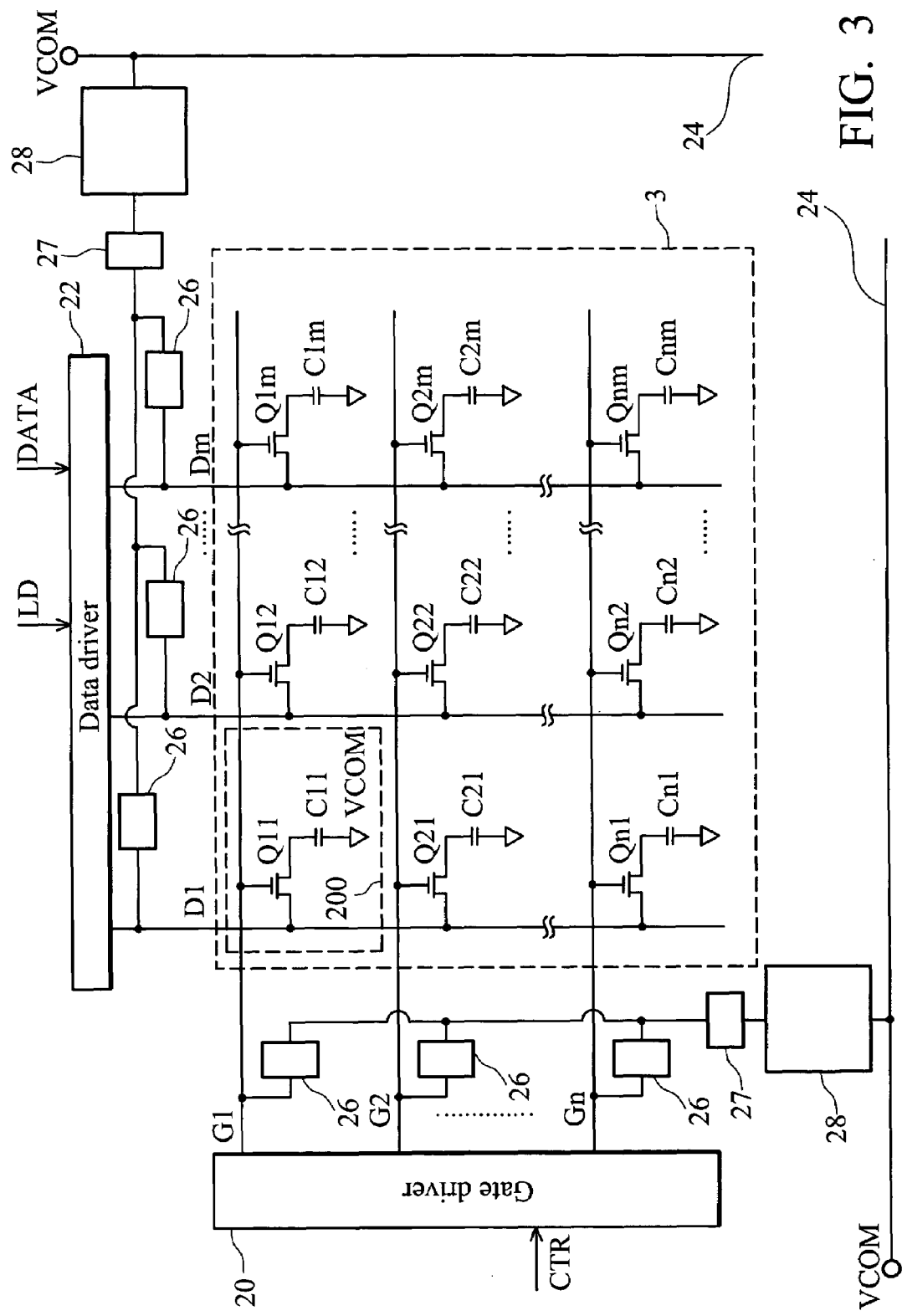
FIG. 3 is a schematic diagram of a conventional liquid crystal display panel and the peripheral driving circuits thereof.

FIG. 3 is a schematic diagram of a conventional liquid crystal display panel and the peripheral driving circuits thereof. As shown in the figure, an LCD panel 3 is formed by interlacing data electrodes (represented by D1, D2, D3, . . . , Dm) and gate electrodes (represented by G1, G2, G3, . . . , Gm), each of the interlaced data electrodes and gate electrodes control a display cell. As an example, interlaced data electrode D1 and gate electrode G1 control the display cell 200. The equivalent circuit of each display cell comprises thin film transistors (TFTs) (Q11-Q1$m$, Q21-Q2$m$, . . . , Qn1-Qnm) and storage capacitors (C11-C1$m$, C21-C2$m$, . . . , Cn1-Cnm). The gates and drains of the TFTs are respectively connected to gate electrodes (G1-Gn) and data electrodes (D1-Dm). The connection can turn on/off all the TFTs on the same line (i.e. positioned on the same scan line) using a scan signal of gate electrodes (G1-Gn), thereby controlling the video signals of the data electrodes to be written into the corresponding display cell. In addition, the storage capacitor is connected between the corresponding thin film transistor and a common electrode 24 with voltage VCOM.

FIG. 3 also shows a portion of the driving circuit of the LCD panel 3. The gate driver 20 outputs one or more scan signals (also referred to as scan pulses) from each of the gate electrodes G1, G2, . . . , Gn according to a predetermined sequence. When a scan signal is carried on one gate electrode, the TFTs within all display cells on the same row or scan line are turned on. When a scan line is selected, data driver 22 outputs a video signal (gray value) to the m display cells of the respective rows through data electrodes D1, D2, . . . , Dm according to the image data to be displayed. After gate driver 20 scans n rows continuously, the display of a single frame is completed. Thus, repeated scans of each scan line can achieve the purpose of continuously displaying an image. As shown in FIG. 3, signal CTR indicates the scan control signal received by the gate driver 20, signal LD indicates a data latch signal of the data driver 22, and signal DATA indicates the image signal received by the data driver 22.

To prevent ESD stress occurring on the data electrode, the gate electrode or the common electrode from damaging the display cells, switches (conventional short ring) 26 and 27 and ESD protection circuit 28 are added between the data electrode and the gate electrode, and the common electrode.

Figure 4:
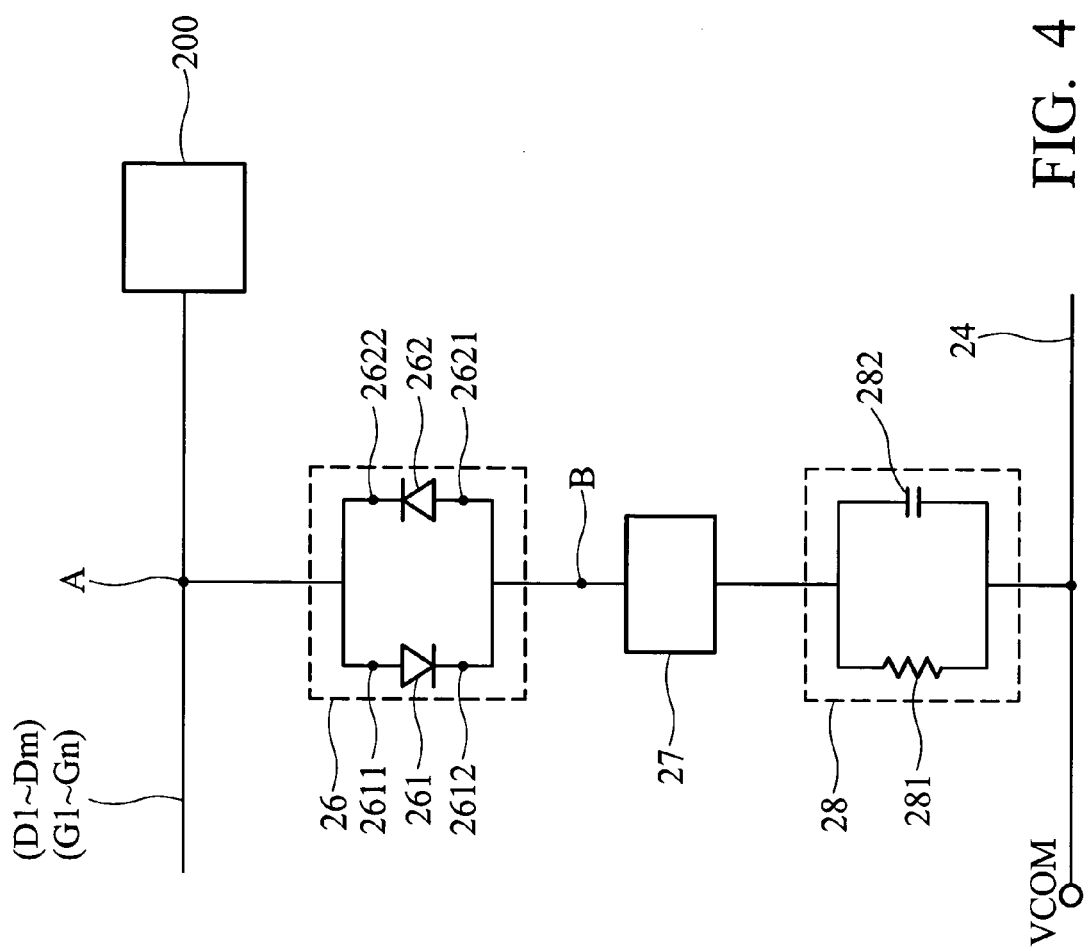
FIG. 4 shows a circuit of the switches 26 and 27 and ESD protection circuit 28 of one embodiment of the present invention.

FIG. 4 shows a circuit of the switches 26 and 27 and ESD protection circuit 28 of one embodiment of the present invention. Switch 26 comprises a first terminal A connected to one of the data electrodes (D1~Dm) or the gate electrodes (G1~Gn), and a second terminal B. Switch 27 (global switch) is connected between the switches 26 and ESD protection circuit 28. According to one embodiment of the present invention, the circuits of the switches 26 and 27 are the same, which are all bi-directional, and comprising diodes 261 and 262.

The anode 2611 of diode 261 is connected to the cathode 2622 of diode 262, and the cathode 2612 of diode 261 is connected to the anode 2621 of diode 262. The connection point of the anode 2611 of diode 261 and the cathode 2622 of diode 262 is a first terminal A, and the connection point of the cathode 2612 of diode 261 and the anode 2621 of diode 262 is a second terminal B. First terminal A and second terminal B are respectively connected to a gate electrode (G1~Gn) or a data electrode (D1~Dm) connected to the display cell 200, and the ESD protection circuit 28.

When the voltage level of one of the anodes respectively of the diodes 261 and 262 exceed the threshold voltage of the diodes, diode 261 or 262 is turned on. In addition, ESD protection circuit 28 comprises a resistive load 281 and capacitive load 282 connected in parallel, between switch 27 and common electrode 24.

When ESD stress occurs on one of the data electrodes (D1~Dm), gate electrodes (G1~Gn) or common m electrode 24, capacitive load 282 is charged. Thus, partial ESD stress passes through resistive load 281 and switches 26 and 27, and then capacitive load 282 releases the stored energy thereof. Thus, ESD stress occurring on the common electrode 24 entering the display cell 200 through data electrodes or gate electrodes is retarded by decreasing the ESD current. In addition, ESD stress occurs on the data electrodes or gate electrodes is released to common electrode 24 through switches 26 and 27 and ESD protection circuit 28, such that the provided ESD protection is similar to the conventional technology.

In addition, capacitive load 282 may be broken by extreme ESD stress. The LCD is will continue to function without the capacitive load 282 but ESD protection is lost. Thus, a suitable capacitive load must be provided to sustain the ESD stress.

In addition, the voltage level of common electrode 24 is approximate fixed, such that the effect of capacitive load 282 is not apparent during normal operation. Thus, the performance of LCD is not affected.

According to the present invention, the ESD protection circuit provides ESD protection occurred on the data, gate and common electrodes. In addition, the circuitry of the present invention is simple and does not require additional elements or increasing costs.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A liquid crystal display, comprising:
   an LCD panel comprising a plurality of display cells respectively coupled between a data electrode, a gate electrode and a common electrode;
   a gate driver outputting scan signals to the gate electrode;
   a data driver outputting video signals to the data electrode;
   a plurality of switches, each comprising a first terminal and a second terminal, wherein the first terminal is coupled to the corresponding data electrode, and wherein the switch is turned on when a voltage level of the first terminal or the second terminal exceeds a threshold voltage, and wherein the switch is a two-terminal switch;
   an ESD protection circuit comprising a capacitive load and a resistive load, coupled between the second terminal and the common; and
   a global switch coupled between the switch and the ESD protection circuit.

2. The protection circuit as claimed in claim 1, wherein the switch comprises:
   a first diode comprising a first anode and a first cathode; and
   a second diode comprising a second anode coupled to the first cathode, and a second cathode coupled to the first anode, wherein the connection point of the first anode and the second cathode is the first terminal, and the connection point of the second anode and the first cathode is the second terminal.

3. The protection circuit as claimed in claim 1, wherein the capacitive load is coupled between the switch and the common electrode.

4. The protection circuit as claimed in claim 1, wherein the resistive load is connected between both terminals of the capacitive load.

5. A liquid crystal display, comprising:
   an LCD panel comprising a plurality of display cells respectively coupled between a data electrode, a gate electrode and a common electrode;
   a gate driver outputting scan signals to the gate electrode;
   a data driver outputting video signals to the data electrode;
   a plurality of switches, each comprising a first terminal and a second terminal, wherein the first terminal is coupled to the corresponding data electrode or the corresponding gate electrode, and the switch is turned on when a voltage level of the first terminal or the second terminal, and wherein the switch is a two-terminal switch;
   an ESD protection circuit comprising a capacitive load and a resistive load, coupled between the second terminal and the common electrode; and
   a global switch coupled between the switch and the ESD protection circuit.

6. The protection circuit as claimed in claim 5, wherein the switch comprises:
   a first diode comprising a first anode and a first cathode; and
   a second diode comprising a second anode coupled to the first cathode, and a second cathode coupled to the first anode, wherein the connection point of the first anode and the second cathode is the first terminal, and the connection point of the second anode and the first cathode is the second terminal.

7. The protection circuit as claimed in claim 5, wherein the capacitive load is coupled between the switch and the common electrode.

8. The protection circuit as claimed in claim 5, wherein the resistive load is connected between both terminals of the capacitive load.

* * * * *